United States Patent [19]

Bacon et al.

[11] Patent Number: 4,610,737
[45] Date of Patent: Sep. 9, 1986

[54] CABLE SPLICE METHOD USING TRANSITION ROD

[75] Inventors: William H. Bacon; Francis S. O'Toole, both of Claremore, Okla.

[73] Assignee: Hughes Tool Company, Houston, Tex.

[21] Appl. No.: 789,204

[22] Filed: Oct. 18, 1985

[51] Int. Cl.⁴ ............................................. B21F 15/08
[52] U.S. Cl. .................................... 156/49; 29/868; 156/296; 174/84 R; 174/88 R; 228/44.7; 228/904; 339/124; 339/150 C
[58] Field of Search ................. 29/868; 156/49, 296; 174/84 R, 88 R; 228/44.1 A, 126, 131, 132, 904; 339/103 R, 124, 150 C

[56] References Cited

U.S. PATENT DOCUMENTS

| | | | |
|---|---|---|---|
| 2,463,231 | 3/1949 | Wyatt | 156/49 |
| 3,035,114 | 5/1962 | Beeker et al. | 174/84 R |
| 3,332,813 | 7/1967 | Clarke | 156/49 |
| 3,383,642 | 5/1968 | Nava et al. | 174/84 R X |
| 3,692,922 | 9/1972 | Sugimoto et al. | 174/88 R X |
| 3,717,717 | 2/1973 | Cunningham et al. | 174/88 R X |
| 3,811,958 | 5/1974 | Maurer | 136/233 |
| 3,838,387 | 9/1974 | Grillet | 174/84 R X |
| 3,984,912 | 10/1976 | Johnston et al. | 174/88 R X |
| 4,160,871 | 7/1979 | Lacroix | 174/84 R |
| 4,198,173 | 4/1980 | Zehren | 174/84 R |
| 4,234,758 | 11/1980 | Guzy | 174/84 R |
| 4,273,953 | 6/1981 | Guzy | 174/84 R |
| 4,341,921 | 7/1982 | Simpson | 174/84 R |
| 4,384,404 | 5/1983 | Watine | 29/871 |

Primary Examiner—Robert A. Dawson
Attorney, Agent, or Firm—James E. Bradley

[57] ABSTRACT

A method of splicing a submersible pump motor lead to a power cable provides a smaller splice. A transition rod is welded between each motor lead conductor and power conductor. The transition rod has a smaller diameter on one end to connect to the diameter of the motor lead. The larger diameter end has a cavity for receiving the power cable conductor. After welding, an insulating layer is molded around each rod. Then, an elastomeric jacket is molded around all three of the rods.

3 Claims, 5 Drawing Figures

CABLE SPLICE METHOD USING TRANSITION ROD

BACKGROUND OF THE INVENTION

1. Field of the Invention

This invention relates in general to cable splices, and in particular to a splice for a submersible pump power cable.

2. Description of the Prior Art

A submersible well pump assembly of the type concerned herein includes a downhole electrical motor. The motor is connected through a seal section on its upper end to a centrifugal pump. Three phase power is delivered over a cable extending from the surface down into the well to the motor.

Normally, the motor has a lead which has on its lower end a pothead that bolts into the upper end of the motor. The lead extends upwardly along the side of the seal section and pump, and is spliced at the top to the three phase conductor cable. The motor lead normally has three solid conductors, each located side-by side and wrapped with an armor in a flat configuration. The power cable usually has conductors of larger diameter, which are normally stranded, and which in many cases are located in a round configuration. In the round configuration, the conductors are spaced around a central axis 120° apart. Flat configurations may also be used.

Normally, the motor lead is constructed and spliced to the power cable at the factory. Because of the differences in conductor diameters, and the differences in configuration between flat and round which often occur, the splice is a problem area. In the prior art technique, the splice is made with a crimping sleeve having cavities on each end. One of the cavities has a larger diameter than the other cavity for receiving the power cable conductor. The other cavity receives the motor lead conductor. After insertion, the ends of the connector are crimped. Then, the connectors and leads are wrapped with insulating tapes and armor. The crimping sleeve has a uniform cylindrical outer diameter.

While this technique is satisfactory, it results in many cases in a rather bulky splice. The splice may catch on objects while the pump is being installed. Also, there is a possibility that the insulation tape will leak.

SUMMARY OF THE INVENTION

In this invention, the connector that joins the two ends of the conductor and power cable is a rod which has an outer diameter that tapers gradually from a larger end to a smaller end. The larger end has a cavity for receiving the power cable conductor. The smaller end is solid and has the same diameter as the motor lead conductor.

In making the splice, the smaller end is abutted against the motor lead conductor and welded. The power cable conductor is inserted into the cavity and welded also, preferably by silver soldering. Then, each conductor is placed in a mold and an insulating layer is molded around each conductor. Then the three conductors are arranged in a second mold where a jacket is extruded around the conductors. Then armor is wrapped around the jacket.

DESCRIPTION OF THE PREFERRED EMBODIMENT

Figure 1:
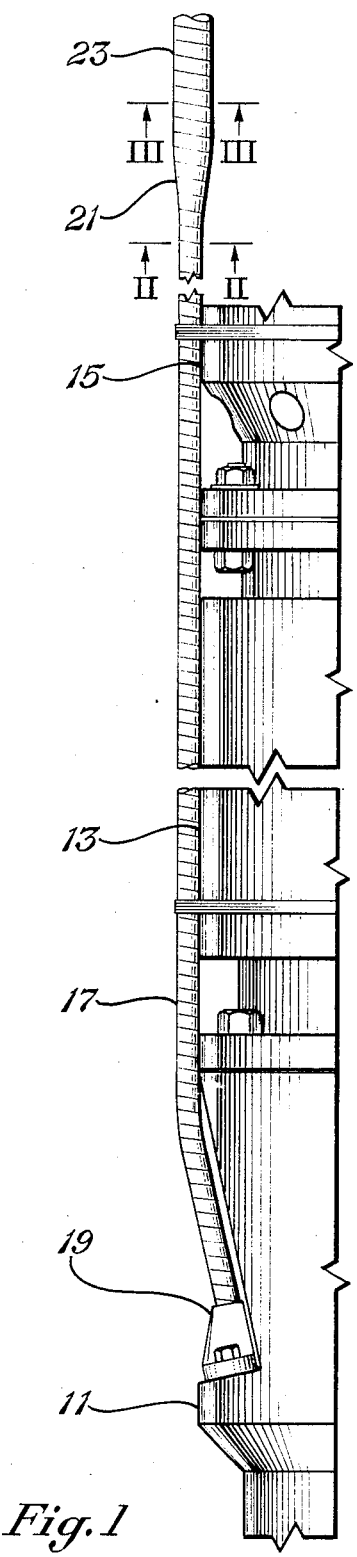
FIG. 1 is a partial side elevational view of a submersible pump assembly having a splice constructed in accordance with this invention.

Referring to FIG. 1, the submersible well pump assembly includes a motor 11, which is a large three-phase AC motor. The upper end of motor 11 is connected to a seal section 13. The seal section is connected to a centrifugal pump 15 and serves to seal the shaft of the motor 11 which extends to the pump 15. A motor lead 17 is mounted to the exterior of the downhole assembly. The motor lead 17 has a lower end or pothead 19 which bolts into the upper end of the motor to form the electrical connection. The upper end of the motor lead 17 is normally about five feet above the top of the pump 15. A splice 21 splices the upper end of the motor lead 17 to the power cable 23. Power cable 23 extends to the surface.

Figure 2:
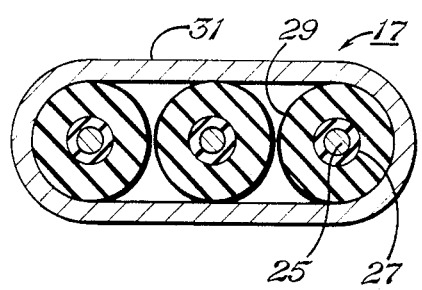
FIG. 2 is a sectional view of the motor lead of the submersible pump assembly of FIG. 1, taken along the line II—II of FIG. 1.

Referring to FIG. 2, a typical motor lead 17 is made up of three solid conductors 25, each spaced side-by-side. Each conductor 25 is surrounded by an insulating layer 27. An elastomeric jacket 29 surrounds each insulating layer 27. The three jacketed and insulated conductors 25 are wrapped with a metallic armor 31, providing a generally flat configuration. One of the flat sides of the motor lead 17 will be placed in contact with the exterior of the seal section 13 and pump 15 and strapped thereto.

Figure 3:
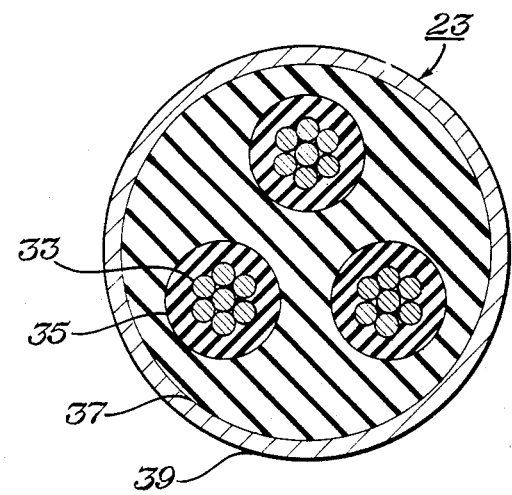
FIG. 3 is a sectional view of the power cable of the submersible well pump assembly of FIG. 1, taken along the line III—III of FIG. 1.

FIG. 3 shows a typical power cable 23 formed in a round configuration. The power cable 23 has three conductors 33, which are often stranded as shown. Conductors 33 are normally larger in diameter than the conductors 25 of the motor lead 17. Each conductor 33 is individually surrounded by an insulating layer 35. In the embodiment shown in FIG. 3, the power cable 23 is of a round configuration. Each insulated conductor 33 is located about a common axis, spaced 120° from the other. A single jacket 37 of an elastomeric material surrounds all three of the insulated conductors 33. Armor 39 is wrapped around the jacket 37. Armor 39 comprises a continuous strip which is helically wrapped around the jacket 37. The materials for the insulated layer 35 and the jacket 37 may be of various types. U.S. Pat. No. 4,472,598, Boyd, et al., Sept. 18, 1984, describes certain suitable materials.

Figure 4:
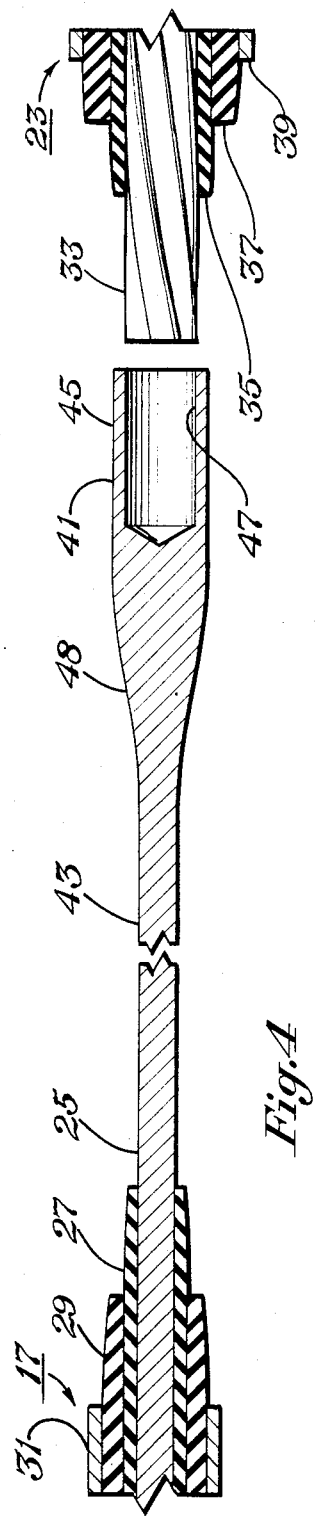
FIG. 4 is a partially sectioned view of portions of a motor lead conductor and a power cable conductor showing a connecting rod for the splice of FIG. 1 prior to connection.
Figure 5:
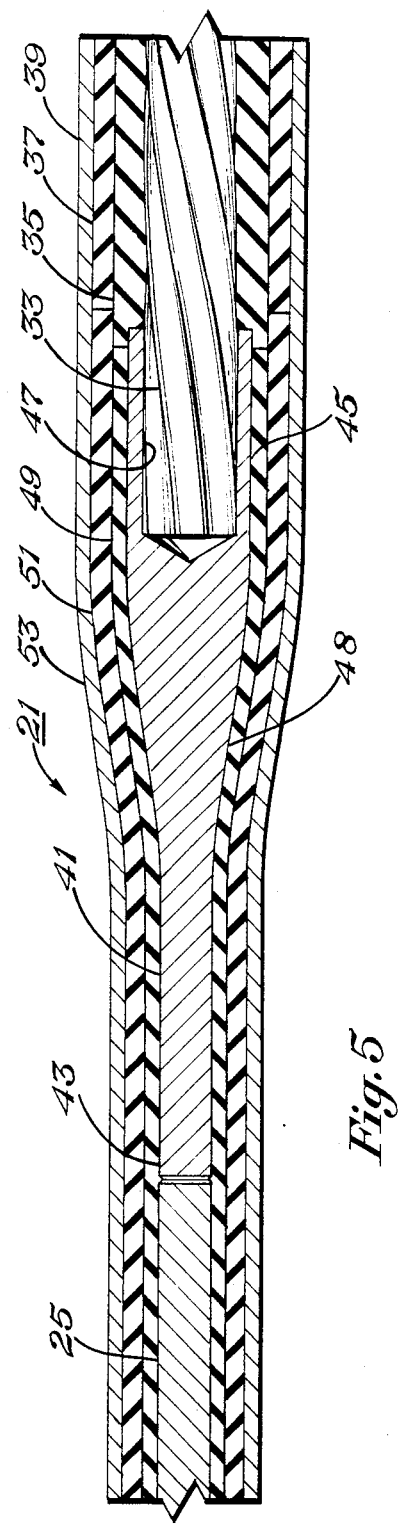
FIG. 5 is a sectional view of a completed splice for the submersible well pump assembly as shown in FIG. 1.

Referring to FIG. 4, components for the splice 21 (FIG. 1) are shown in more detail. The components include a connector rod 41. Rod 41 is of a conductive metal having a smaller end 43 which is solid and which preferably has an outer diameter close to or the same as the outer diameter of the motor lead conductor 25. The outer diameter on the other end 45 is larger. The larger end 45 has a cavity 47 which extends a short distance into it. Cavity 47 is slightly greater in diameter than the stranded conductor 33.

This results in an outer configuration with a tapered section 48. The tapered section 48 is generally conical and gradually merges with cylindrical portions on the ends 43 and 45. Rod 41 is not shown to scale, and in the preferred embodiment will have a cylindrical portion on end 43 that is greater in length than the length of the section 48 and greater than the length of the cylindrical portion of the larger end 45. Typically, the rod 41 will be about 4½ inches in length, with the cylindrical portion of the larger end 45 being one inch in length, the tapered section 48 being one inch in length, and the cylindrical portion of the smaller end 43 being 2½ inches in length. The cavity is preferably about ½ inch in depth. The diameters of the ends 43 and 45 may vary depending upon the diameters of the conductors 25 and 33. It is not necessary that end 43 be precisely the same diameter as the motor conductor 25. Rod 41 is preferably copper which is hard drawn to achieve the desired configuration.

In making the slice, first, the insulating layers 27 and 35 and the jackets 29 and 37 will be stripped back. The armor layers 31 and 39 will be unrolled and peeled back. The smaller end 43 is abutted against the end of the conductor 25 and welded by conventional butt welding techniques. In this technique, a hydraulic press forces the copper ends together under high enough pressure to cause the metal to flow together and unite. Presses of this nature are commercially available. The standed conductor 33 is inserted into the cavity 47 and welded by silver soldering techniques. The term "weld" as used herein, refers generically to any technique of joining metallic parts by causing the metals to unite by flowing together, including pressure and also using heat such as in soldering and brazing.

Then, a mold (not shown) is placed around each of the rods 41, and insulating material is injected to form an insulating layer 49. The material of insulating layer 49 will be the same as insulating layers 27 and 35. Then, after curing, the three insulated rods 41 are arranged in another mold (not shown), and elastomeric material is injected to form jacket 51. Jacket 51 is of the same material as jackets 29 and 37. The insulating layer 49 and the jacket 51 both smoothly join the respective layers and jackets on the motor leads 17 and power cable 23. Then the armor straps 31 and 39 are re-wrapped around the jacket 51, as indicated by the numeral 53. The ends of the armor straps 31 and 39 may be joined as by welding.

The invention has significant advantages. The tapered configuration of the connecting rod provides a less bulky splice. The welding on the ends, rather than using crimping techniques, provide for a smaller splice. The uniform transition allows insulation to be molded around the splice area to provide a small attractive splice. This should reduce the chance for leakage and for damage to occur while running into the well.

While the invention has been shown in only one of its forms, it should be apparent to those skilled in the art that it is not so limited but is susceptible to various changes without departing from the scope of the invention.

We claim:

1. A method of splicing a submersible pump motor lead to a three-phase power cable, the motor lead and the power cable each having three conductors, with the conductors of the motor lead being smaller in diameter than the conductors of the power cable, the method comprising in combination:
   providing a plurality of metal transition rods, each with a larger diameter on one end than on the other end, and with a tapered section located between the ends;
   joining each conductor of the motor lead to the smaller end of one of the rods;
   joining each conductor of the power cable to the larger end of one of the rods; then
   insulating the rods.

2. A method of splicing a submersible pump motor lead to a three-phase power cable, the motor lead and the power cable each having three conductors, the conductors of the motor lead being smaller in diameter than the conductors of the power cable, the method comprising in combination:
   providing a plurality of metal transition rods, each with a larger diameter on one end than on the other end, and with a tapered section located between the ends, the larger diameter end having a cavity therein;
   welding each conductor of the motor lead to the smaller end of one of the rods;
   inserting each conductor of the power into one of the cavities and welding each conductor of the power cable to one of the rods; then
   insulating the rods.

3. A method of splicing a submersible pump motor lead to a three-phase power cable, the motor lead and the power cable each having three conductors, the conductors of the motor lead being solid and small in diameter than the conductors of the power cable, which are stranded, the method comprising in combination:
   providing a plurality of metal transition rods, each having a smaller diameter on one end and a larger diameter on the other end, the larger end having an axial cavity slightly greater in diameter than the conductors of the power cable, each rod having a smooth tapered section between the ends;
   abutting the end of each motor lead conductor to the smaller end of one of the rods and welding the motor lead conductor to the rod;
   inserting each power cable conductor into one of the cavities and welding the power cable conductor to the rod; then
   molding an elastomeric insulating layer around each of the rods individually; then
   molding a single elastomeric jacket around all three of the rods; then
   wrapping the jacket with a metallic armor.

* * * * *

UNITED STATES PATENT OFFICE
CERTIFICATE OF CORRECTION

Patent No. 4,610,737          Dated September 9, 1986

Inventor(s) William H. Bacon; Francis S. O'Toole

It is certified that error appears in the above-identified patent and that said Letters Patent are hereby corrected as shown below:

Column 3, line 25, "slice" is changed to --splice--;

Column 4, line 35, "power", is changed to --power cable--;

Column 4, line 42, "small" is changed to --smaller--.

Signed and Sealed this

Tenth Day of March, 1987

Attest:

DONALD J. QUIGG

Attesting Officer

Commissioner of Patents and Trademarks